United States Patent
Garrett et al.

(10) Patent No.: US 9,450,821 B2
(45) Date of Patent: *Sep. 20, 2016

(54) METHOD AND SYSTEM FOR COMBINING AND/OR BLENDING MULTIPLE CONTENT FROM DIFFERENT SOURCES IN A BROADBAND GATEWAY

(71) Applicant: BROADCOM CORPORATION, Irvine, CA (US)

(72) Inventors: David Garrett, Tustin, CA (US); Jeyhan Karaoguz, Irvine, CA (US); Xuemin Chen, Rancho Santa Fe, CA (US); Wael William Diab, San Francisco, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/523,139

(22) Filed: Oct. 24, 2014

(65) Prior Publication Data

US 2015/0106421 A1    Apr. 16, 2015

Related U.S. Application Data

(63) Continuation of application No. 12/982,073, filed on Dec. 30, 2010, now Pat. No. 8,874,748.

(60) Provisional application No. 61/351,696, filed on Jun. 4, 2010.

(51) Int. Cl.
*G06F 15/16* (2006.01)
*H04L 12/24* (2006.01)
(Continued)

(52) U.S. Cl.
CPC ........... *H04L 41/0816* (2013.01); *G05B 13/02* (2013.01); *G05F 1/66* (2013.01);
(Continued)

(58) Field of Classification Search
None
See application file for complete search history.

(56) References Cited

U.S. PATENT DOCUMENTS 6,326,982 B1    12/2001    Wu et al.
6,721,957 B1 *  4/2004    Lawrence .......... H04N 21/2221
                                                   348/E5.108

(Continued)

OTHER PUBLICATIONS

Non-Final Office Action for U.S. Appl. No. 12/982,073 mailed Jan. 4, 2013.

(Continued)

*Primary Examiner* — Joshua Joo
(74) *Attorney, Agent, or Firm* — Foley & Lardner LLP; Christopher J. McKenna; Paul M. H. Pua

(57) ABSTRACT

A method and system are provided in which a broadband gateway may receive different content from different sources, may combine the content to produce a combined content, and may communicate the combined content to a device connected to the broadband gateway. The content may be automatically and/or manually synchronized. The synchronization may be based on a clock signal received from the device, a clock signal from another device connected to the broadband gateway, and/or a clock signal received through one or more network access service providers. The content may be video image data and/or audio data. Moreover, user-generated content may be received and combined by the broadband gateway when in a peer-to-peer communication configuration with the source of the content. When more than two different content are received, the broadband gateway may be utilized to select which contents to combine.

18 Claims, 10 Drawing Sheets

(51) Int. Cl.

| | | |
|---|---|---|
| H04L 29/06 | (2006.01) | |
| H04W 12/08 | (2009.01) | |
| H04N 21/63 | (2011.01) | |
| H04L 29/08 | (2006.01) | |
| H04L 12/28 | (2006.01) | |
| G06F 21/62 | (2013.01) | |
| G06Q 20/10 | (2012.01) | |
| H04L 12/857 | (2013.01) | |
| G06Q 30/02 | (2012.01) | |
| G06F 21/10 | (2013.01) | |
| G06Q 40/00 | (2012.01) | |
| G05B 13/02 | (2006.01) | |
| G05F 1/66 | (2006.01) | |
| G06Q 30/04 | (2012.01) | |
| H04L 12/14 | (2006.01) | |
| H04L 12/66 | (2006.01) | |
| H04N 5/445 | (2011.01) | |
| H04N 21/482 | (2011.01) | |
| H04N 21/436 | (2011.01) | |
| H04N 21/454 | (2011.01) | |
| H04N 21/6371 | (2011.01) | |
| H04N 21/6373 | (2011.01) | |
| H04N 21/472 | (2011.01) | |
| H04N 21/258 | (2011.01) | |
| H04N 21/6543 | (2011.01) | |

(52) U.S. Cl.
CPC .......... *G06F 21/10* (2013.01); *G06F 21/6245* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/2801* (2013.01); *H04L 12/2838* (2013.01); *H04L 12/66* (2013.01); *H04L 29/06095* (2013.01); *H04L 41/32* (2013.01); *H04L 47/2491* (2013.01); *H04L 63/02* (2013.01); *H04L 63/0281* (2013.01); *H04L 63/10* (2013.01); *H04L 63/205* (2013.01); *H04L 65/102* (2013.01); *H04L 65/1023* (2013.01); *H04L 65/40* (2013.01); *H04L 67/10* (2013.01); *H04L 67/104* (2013.01); *H04L 67/1078* (2013.01); *H04L 67/1095* (2013.01); *H04L 67/12* (2013.01); *H04L 67/16* (2013.01); *H04L 67/2842* (2013.01); *H04N 5/445* (2013.01); *H04N 21/43615* (2013.01); *H04N 21/454* (2013.01); *H04N 21/482* (2013.01); *H04N 21/632* (2013.01); *H04N 21/6371* (2013.01); *H04N 21/6373* (2013.01); *H04W 12/08* (2013.01); *G06F 2221/07* (2013.01); *H04L 41/5019* (2013.01); *H04L 65/4084* (2013.01); *H04L 2012/2849* (2013.01); *H04N 21/258* (2013.01); *H04N 21/47202* (2013.01); *H04N 21/6543* (2013.01); *Y02B 60/43* (2013.01)

(56) References Cited

U.S. PATENT DOCUMENTS

| | | | |
|---|---|---|---|
| 6,757,707 | B1 | 6/2004 | Houghton et al. |
| 7,567,630 | B2 * | 7/2009 | Boehl ...................... H04L 1/22 375/326 |
| 8,239,748 | B1 | 8/2012 | Moore et al. |
| 2002/0080827 | A1 | 6/2002 | Lee |
| 2003/0033157 | A1 | 2/2003 | Dempski et al. |
| 2003/0236902 | A1 | 12/2003 | Weiss et al. |
| 2008/0092201 | A1 | 4/2008 | Agarwal et al. |
| 2008/0175558 | A1 * | 7/2008 | Shin .................. H04N 21/2368 386/337 |
| 2009/0013086 | A1 | 1/2009 | Greenbaum |
| 2009/0172723 | A1 | 7/2009 | Shkedi et al. |
| 2009/0210395 | A1 | 8/2009 | Sedam |
| 2010/0049719 | A1 | 2/2010 | Payne et al. |
| 2010/0057748 | A1 | 3/2010 | Ensor et al. |
| 2010/0178036 | A1 | 7/2010 | Heinmiller et al. |
| 2010/0180297 | A1 | 7/2010 | Levine et al. |
| 2010/0319043 | A1 | 12/2010 | Jain et al. |
| 2011/0047238 | A1 | 2/2011 | Balasaygun et al. |
| 2011/0072147 | A1 | 3/2011 | Kirksey |
| 2011/0154404 | A1 * | 6/2011 | Piepenbrink ........ H04N 5/44543 725/53 |
| 2012/0079029 | A1 | 3/2012 | Damola et al. |
| 2013/0254821 | A1 * | 9/2013 | Kellerman ........ G06F 17/30905 725/110 |

OTHER PUBLICATIONS

Non-Final Office Action for U.S. Appl. No. 12/982,073 mailed Aug. 27, 2013.

Final Office Action for U.S. Appl. No. 12/982,073 mailed Apr. 21, 2014.

Notice of Allowance for U.S. Appl. No. 12/982,073 mailed Jul. 14, 2014.

* cited by examiner

METHOD AND SYSTEM FOR COMBINING AND/OR BLENDING MULTIPLE CONTENT FROM DIFFERENT SOURCES IN A BROADBAND GATEWAY

CROSS-REFERENCE TO RELATED APPLICATIONS/INCORPORATION BY REFERENCE

This application is a continuation of and claims priority to and the benefit of U.S. patent application Ser. No. 12/982,073, filed Dec. 30, 2010, which claims the benefit of U.S. Provisional Patent Application 61/351,696, filed on Jun. 4, 2010. The entire contents of the foregoing applications are hereby incorporated herein by reference for all purposes.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/984,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453, filed on Dec. 30, 2010;
U.S. patent application Ser. No. 12/982,172 filed on Dec. 30, 2010;
U.S. patent application Ser. No. 12/982,429, filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,753 filed on Dec. 30, 2010.

Each of the above stated applications is hereby incorporated herein by reference in its entirety.

FIELD OF THE INVENTION

Certain embodiments of the invention relate to broadband access. More specifically, certain embodiments of the invention relate to combining and/or blending multiple contents from different sources in a broadband gateway.

BACKGROUND OF THE INVENTION

As the use of home networks grow in popularity, the capabilities of today's gateway devices may not be adequate to support certain applications and content to be provided through such networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for combining and/or blending multiple content from different sources in a broadband gateway, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
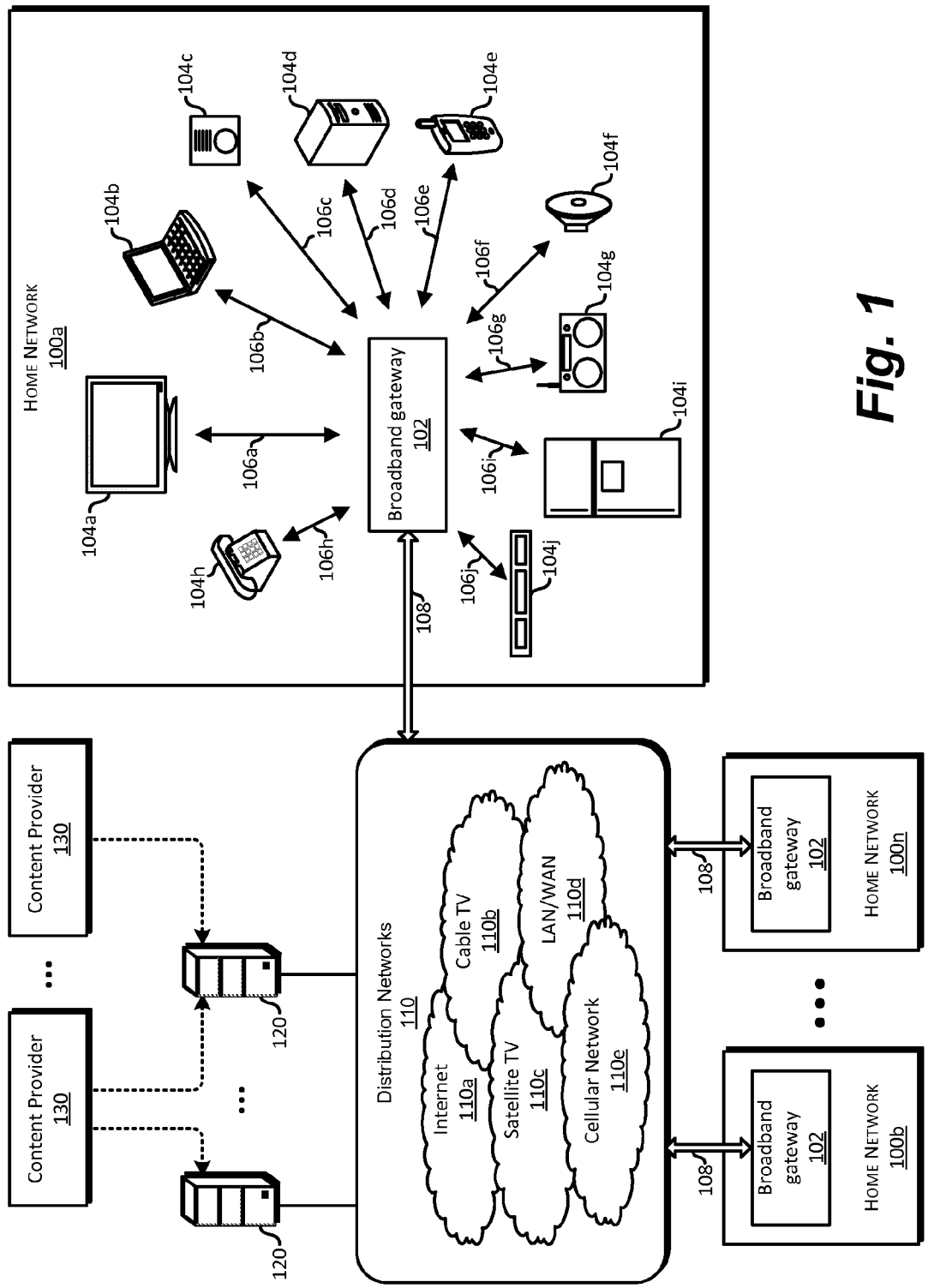
FIG. 1 is a block diagram that illustrates an exemplary communication system that comprises a home network serviced by a broadband gateway, in accordance with an embodiment of the invention.

Certain embodiments of the invention can be found in a method and system for combining and/or blending multiple contents from different sources in a broadband gateway. In accordance with various embodiments of the invention, a broadband gateway may receive a first content from a first source and a second content from a second source, and may combine the first content and the second content to produce a combined content. Once the combined content is generated, the broadband gateway may communicate the combined content to a device for output or presentation to a user. The combined content may comprise video image data and/or audio data and the device may be able to provide a user with a display of the video image data and/or a reproduction of the audio data. The combination may comprise combining a portion of the first content and a portion of the second content such that the portion of the first content and the portion of the second content are output or presented to the user at different periods of time.

The combination of the first content and the second content may comprise synchronizing different portions of the content. The synchronization may be automatically performed by the broadband gateway and/or may be performed by the broadband gateway in response to user input. The synchronization of the first content and the second content may be based on one or more of a clock signal received from the device that is to output the combined content to the user, a clock signal received from another device connected to the broadband gateway, and a clock signal from the broadband gateway. The reference or clock signal from the broadband gateway may be generated by the broadband gateway from a regional clock signal and/or a global clock signal received by the broadband gateway from, for example, a service provider and/or from a Global Positioning System (GPS) service. In some instances, the synchronization may be based on a slowest of a clock signal associated with the first content and a clock signal associated with the second content.

Different entities may be the source of the content received by the broadband gateway. For example, a source of the content may be a content provider, a service provider, a network access service provider, or a peer communication device. In this regard, content from the peer communication device may refer to user-generated content received from a source that is in a peer-to-peer communication configuration with the broadband gateway. The peer communication device may utilize a broadband gateway in the peer-to-peer communication configuration.

The broadband gateway may receive different types of content. In some instances, the content may comprise video image data and/or audio data. The type of content received may vary based on the source of the content. Moreover, the broadband gateway may receive more than two contents and may select from among the received content to generate the combined content. For example, in addition to a first content and a second content, the broadband gateway may receive a third content from a third first source. In such an instance, the broadband gateway may select two contents from the first, second, and the third contents, and may combine the two selected contents to produce a combined content.

The combining and/or blending of multiple contents described herein may refer to, for example, aggregating, blending, putting together, adding together, and/or mixing together at least a portion of each of two or more of the multiple contents received by a broadband gateway.

FIG. 1 is a block diagram that illustrates an exemplary communication system that comprises a home network serviced by a broadband gateway, in accordance with an embodiment of the invention. Referring to FIG. 1, there is shown a home network 100a, a plurality of distribution networks 110, a plurality of network access service providers 120, and a plurality of content providers 130. The home network 100a may be serviced by a broadband gateway 102. Also shown in FIG. 1 are additional home networks 100b, . . . , 100n. Each of the home networks 100b, . . . , 100n may also be serviced by a broadband gateway 102.

The content providers 130 may generate, capture, and/or package content, such as multimedia content, for example, that may be distributed to end users. Content originating from the content providers 130 may be distributed to end users (e.g., consumers) by the network access service providers 120. The term "network access service provider" as utilized herein, may be distinguished from the more generic term "service provider" that may refer to services other than providing physical layer access to a network. An entity that functions as a network access service provider, however, may also provide content and/or services other than network access. In some instances, an entity that functions as a network access service provider may generate, capture, and/or package content, such as multimedia content, for example, that may be distributed to end users. The content received through the network access service providers 120 may comprise programming scheduling information and/or metadata associated with such programming. In some instances, the metadata may originate in a server, such as a web server, associated with one or more of the content providers 130.

The network access service providers 120 may comprise various entities and/or networks that provide access to content and/or services using different access technologies, such as multimedia, television, Internet, phone, Ethernet, multimedia over coax alliance (MoCA), passive optical network (PON), and/or cellular services, for example, to a plurality of end users. The end users may utilize devices that may be configured to support the necessary networking and/or communication infrastructures and/or standards. For example, end users may utilize cellular devices or smartphones, personal computers (PCs), servers, and/or set-top boxes. Exemplary network access service providers may comprise, for example, cellular service providers (e.g., AT&T, Verizon), cable television (CATV) providers (e.g., Comcast, RCN, Cox), satellite television providers (e.g., DirectTV, DISH Network), Internet service providers (ISPs), digital subscriber line (DSL) providers, WiMAX providers, and/or plain old telephone service (POTS) providers. In an exemplary embodiment of the invention, the broadband gateway 102 may enable connecting to a plurality of network access service providers 120 to facilitate receiving content originating from one or more of the content providers 130. When more than one network access service provider 120 provides access to content and/or services to the broadband gateway 102, each network access service provider 120 may do so through a separate physical layer access. In an embodiment of the invention, a separate physical layer access may be enabled in the broadband gateway 102 by having a separate network interface within the broadband gateway 102 for each network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing content generated by the content providers 130 and/or by the network access service providers 120 to end users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the network access service providers 120, the distribution networks 110, and/or the content providers 130.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may support configuring and/or using a plurality of broadband connections 108 to the distribution networks 110. The broadband connections 108 may comprise wired and/or wireless connections between the broadband gateway 102 and the distribution networks 110, which may enable communication between the broadband gateway 102 and the network access service providers 120. The broadband gateway 102 may operate as an interface device that may allow one or more network access service providers and/or content providers to interact with various devices in the home network. In this regard, the broadband gateway 102 may enable communication with each of the network access service providers 120 through separate interfaces. That is, each network access service provider 120 from the plurality of network access service providers 120 may interface with the broadband gateway 102 through a network interface that is separate and/or different from a network interface associated with each of the other network access service providers 120.

A single broadband gateway 102 may be operable to handle multiple physical layer access connections, where a physical layer may refer to an OSI layer 1. The connections may provide access to one or more of the distribution networks 110. The distribution networks 110 may be owned, operated, leased, or otherwise associated with different network access service providers 120. For example, one network access service provider 120 may provide network access to the broadband gateway 102 through a cable television connection over coaxial cabling associated with the CATV network 110b. In another example, a different network access service provider 120 may provide network access to the broadband gateway 102 through a DSL connection over twisted-pair cabling associated with the Internet 110a. In some instances, the broadband gateway 102 may be operable to concurrently communicate over several physical layer connections associated with the multiple network access service providers 120.

The broadband gateway 102 may be operable to perform and/or provide various services that may pertain to enabling and/or facilitating reception of multimedia content. The content may be delivered through one or more network access services providers 120 and their associated networks, which may comprise at least some portions of the distribution networks 110. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100a, using wired and/or wireless communication links.

Devices serviced by, and/or connected to the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a detector 104c (e.g., a smoke detector, a carbon monoxide detector, a security alarm), a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, which may be communicatively coupled to only the broadband gateway 102, are shown, the invention may not be so limited. Accordingly, the devices 104a-104j, which may be communicatively coupled to multiple broadband gateways in a local or home network, may be implemented without departing from the spirit and scope of various embodiments of the invention.

As illustrated in FIG. 1, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations may be possible through the broadband gateways 102 in the home networks.

In operation, the broadband gateway 102 may be utilized to combine and/or blend multiple contents to generate or produce a combined content that may be utilized in the home network 100a. In this regard, the broadband gateway 102 may receive different contents from different sources, may combine the contents to produce the combined content, and may communicate the combined content to a device connected to the broadband gateway, such as one or more of the home devices 104a-104j. The device receiving the combined content may output the combined content to a user.

In order to combine the contents, the broadband gateway 102 may automatically and/or manually synchronize the contents based on, for example, a clock received from the device, a clock from another device connected to the broadband gateway 102, and/or a clock from the broadband gateway 102. In some instances, the contents from the various sources may be temporally combined, for example. For example, the contents from two different sources may be combined in such a manner as to produce an alternating sequence in which a portion of the content from one source is followed by a portion of the content from another source. The contents that are to be combined may each comprise video image data and/or audio data, for example. Moreover, user-generated content may be received and combined by the broadband gateway 102 with other content that is also received by the broadband gateway 102. When the more than two different contents are received, the broadband gateway 102 may be utilized to select which from among the several contents received are to be combined.

Figure 2A:
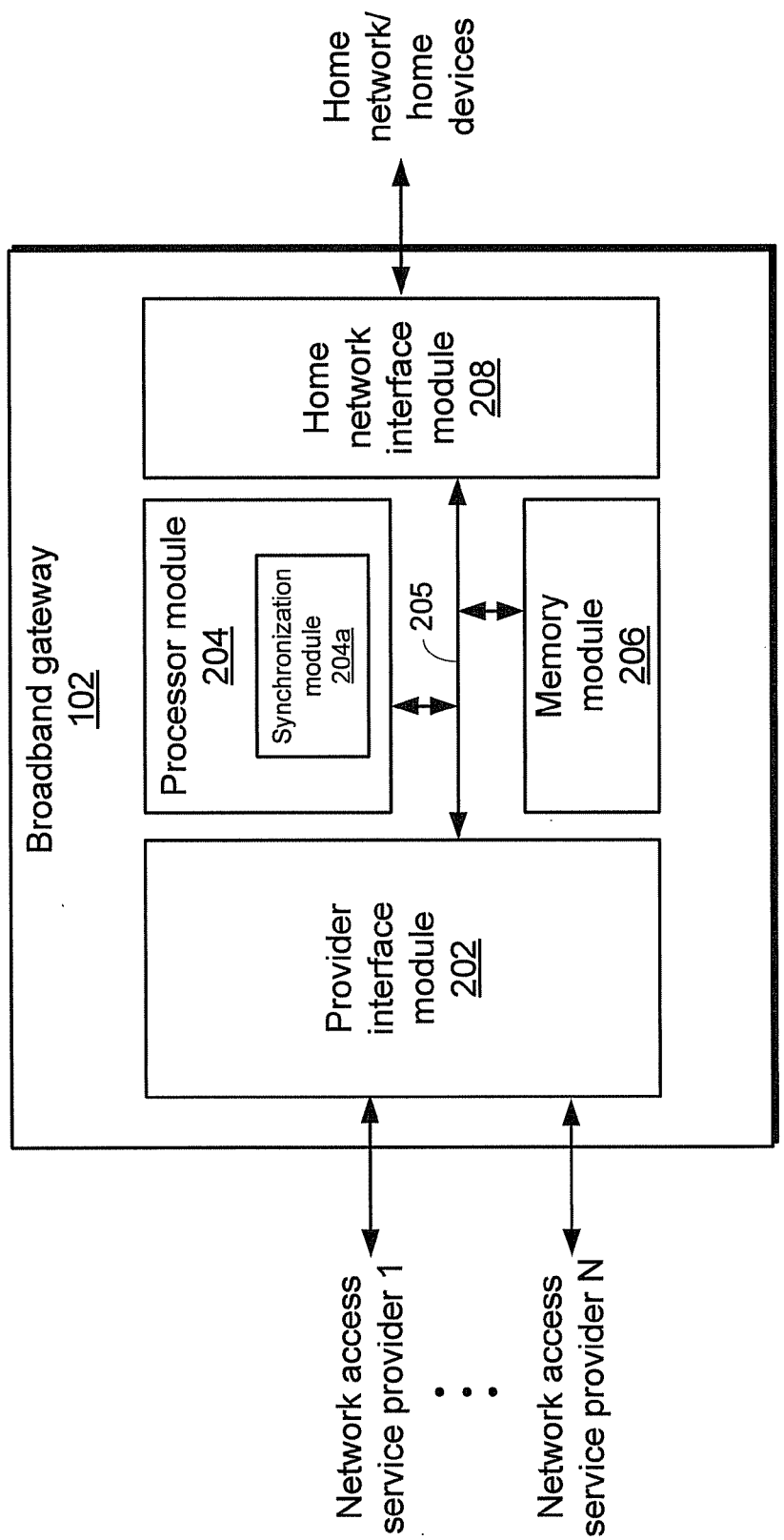
FIGS. 2A and 2B are block diagrams that illustrate exemplary broadband gateways, in accordance with embodiments of the invention.

FIG. 2A is a block diagram that illustrates an exemplary broadband gateway, in accordance with an embodiment of the invention. Referring to FIG. 2A, there is shown a more detailed view of an exemplary architecture of the broadband gateway 102 described above with respect to FIG. 1. The broadband gateway 102 may comprise suitable logic, circuitry, code, and/or interfaces that may be operable to provide connectivity between one or more networks, such as the distribution networks 110, for example, and one or more devices in a home network, such as the home devices 104a-104j in the home network 100a. Access from the broadband gateway 102 to the distribution networks 110 may be provided through one or more of the network access service providers 120.

The broadband gateway 102 may operate as an interface device that allows one or more network access service providers 120 and/or content providers 130 to interact with various devices in the home network 100a, such as the home devices 104a-104j. Moreover, when more than one network access service provider 120 is utilized to provide access, the broadband gateway 102 may handle each of network access service providers 120 through a separate physical layer access.

The broadband gateway 102 may comprise suitable hardware and/or software to provide some or all of the functions and/or operations of one or more of a modem, a router, and a switch. The modem functions and/or operations may be those of a DSL modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. The processor module 204 may comprise a synchronization module 204a. The modules in the broadband gateway 102 may communicate with one or more of the other modules through one or more buses and/or connections 205. In some instances, the broadband gateway 102 may be such that the various modules listed above may be distributed over multiple devices. In such instances, the buses and/or connections 205 may enable communication between the various modules across the multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data and/or to send data through one or more of the network access service providers 120, for example. The data received and/or sent may be associated with content from the content providers 130 and/or from the network access service providers 120. The provider interface module 202 may be operable to support multiple communication protocols, standards, and/or data transport technologies. As illustrated in FIG. 2, the provider interface module 202 may be operable to interface with one or more of the network access service providers 120. In an embodiment of the invention, the provider interface module 202 may be operable to interface with N of the network access service providers 120. The provider interface module 202 may be communicatively coupled to the various network access service providers 120 via a plurality of broadband connections 108 described above with respect to FIG. 1. In some instances, the provider interface module 202 may be utilized, alone or in connection with the processor module 204, to select which contents of those received by the broadband gateway 102 are to be combined in the processor module 204.

The processor module 204 may comprise suitable logic, circuitry, code, and/or interfaces that may be operable to process data received and/or sent through one or more of the network access service providers 120, and/or data received from and/or sent to one or more devices in the home network 100a. In this regard, the processor module 204 may comprise one or more portions that are suitable to handle certain types of data such as video data and/or audio data, for example. For example, the processor module 204 may comprise a core processor (not shown), a video processor (not shown), and an audio processor (not shown).

The processor module 204 may be operable to combine or blend content from several sources for use as a combined content in the home network 100a. In this regard, the processor module 204 may be operable to select which content to combine and/or the manner in which the selected content is to be combined. Moreover, the processor module 204 may be operable to search for content that may be associated or related with a particular content of interest. In this regard, the processor module 204 may be utilized to search through programming scheduling information and/or metadata received by the broadband gateway 102 through the provider interface module 202. For example, the processor module 204 may be operable to search for television programming, radio programming, streaming data programming, or the like to find content that may be related to content that is of interest to a user. The content of interest may refer to the content associated with a particular channel or station being considered by the user for combination with some other content. The processor module 204 may also be operable to search through metadata to identify content that may be related to content that is of interest to the user. In some instances, the processor module 204 may be operable to run a software agent that may obtain such programming information and/or metadata by searching on the Internet, for example.

The synchronization module 204a may comprise suitable logic, circuitry, code, and/or interfaces that may be operable to synchronize multiple contents received by the broadband gateway 102. In this regard, the synchronization of content may be based on one or more of a clock signal associated with each of the contents received, a clock signal received from a device on which the combined contents is to be output to a user, a clock signal received from another home device communicatively coupled to the broadband gateway 102, and a clock signal from the broadband gateway 102. In some instances, the synchronization module 204a may perform the content synchronization based on the slowest of clock signal of the various contents to be combined.

The synchronization module 204a may enable automated and/or manual synchronization. For example, the synchronization module 204a may enable two or more contents to be automatically synchronized based on reference or synchronization signals that may be associated with the content and/or with the broadband gateway 102. The synchronization module 204a may enable automatic synchronization to within an acceptable and/or programmable synchronization error. When a manual or feedback operation is enabled, the synchronization module 204a may receive one or more instructions based on user inputs that may be utilized to provide an offset or delay to at least one of the contents to enable synchronization. For example, the user may be presented with the combined content and may adjust a control through an input device until the combined content is synchronized to his or her liking. Any time delay that may have been perceptible to the user may be substantially corrected in this manner.

The synchronization module 204a may comprise one or more phase-locked loops (PLL) (not shown) that may be utilized as a reference to synchronize the contents that are to be combined. In this regard, synchronization may be carried out in multiple steps, such as a coarse synchronization and a fine synchronization, each of which may utilize a difference reference, for example.

In an embodiment of the invention, the synchronization module 204a may enable a first content and a second content to be synchronized by holding a first synchronization signal associated with the first content as a reference signal and locking a second synchronization signal associated with the second content to the reference signal. In another embodiment of the invention, the synchronization module 204a may enable the first content and the second content to be synchronized by locking the first synchronization signal and the second synchronization signal to a reference provided by the broadband gateway 102.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device. The memory module 206 may be operable to store data associated with the generation of combined content in the processor module 204. In some instances, the memory module 206 may be utilized to buffer content, such as video image data and/or audio data, for example, before such content is combined. The memory module 206 may be operable to store historical information associated with previous content searches and/or content combinations performed by the processor module 204. The historical information stored in the memory module 206 may be utilized by the processor module 204 to identify and/or rank content that a user may wish to combine with other content.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies.

In operation, the broadband gateway 102 may generate a menu or other type of graphical user interface in which various types of associated or related content may be presented to a user through a display device. Such content may be received by the broadband gateway 102 through the provider interface module 202 and may have originated at different sources. The provider interface module 202 and/or the processor module 204 may be utilized to select which contents to combine. The processor module 204 may be utilized to combine or blend the selected contents to produce a combined content that may be utilized in the home network 100a. The combined content may be communicated through the home network interface module 208 to one or more of the home devices 104a-104j. The contents may be automatically and/or manually synchronized by the synchronization module 204a in the processing module 204. For manual synchronization, the user may perceive the combined content that is being output from one of the home devices and may instruct the broadband gateway 102 to adjust a time delay or time offset between the various content that are being combined. In an embodiment of the invention, the processor module 204 may be operable to enable various sources to be temporally combined. For example, the processor module 204 may support alternating the display of video from different sources. The contents combined by the processor module 204 may comprise video image data and/or audio data. Moreover, user-generated content may be received through the provider interface module 202 and may be combined by the processor module 204 when the broadband gateway 102 is in peer-to-peer communication with the source of the content.

Figure 2B:
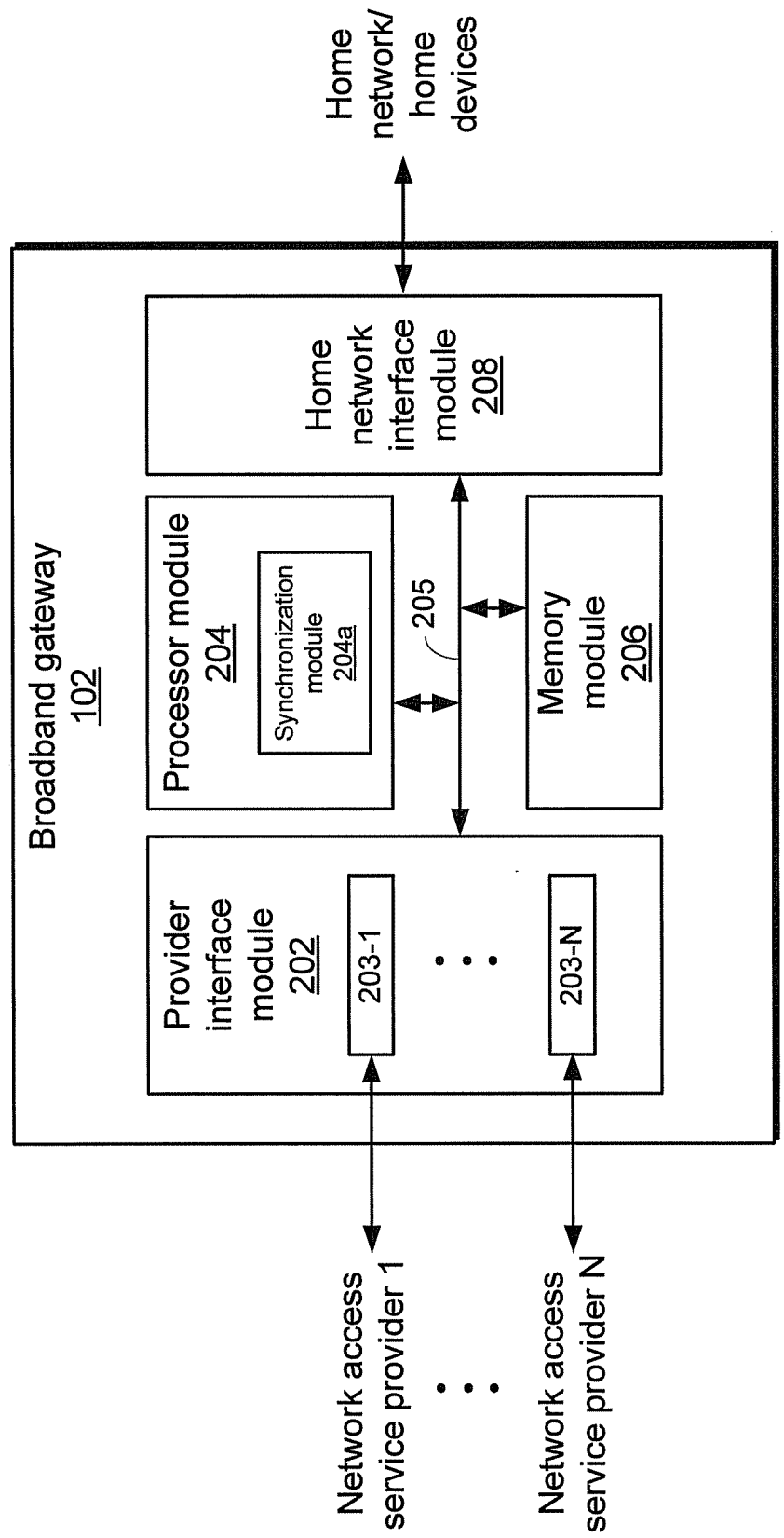

FIG. 2B is a block diagram that illustrates an exemplary broadband gateway, in accordance with another embodiment of the invention. Referring to FIG. 2B, there is shown the broadband gateway 102 with the provider interface module 202 comprising N separate network interfaces 203-1, . . . , 203-N, each of which is associated with one of the N network access service providers 120. In this manner, the broadband gateway 102 may separately interface with the network access service providers 120. The network interfaces 203-1, . . . , 203-N may enable the broadband gateway 102 to handle separate physical layer access for each of the N network access service providers 120. For example, the broadband gateway 102 may interface with each of a cellular service provider, a CATV provider, a satellite television provider, an ISP, and/or POTS provider through a separate network interface, each of which comprises suitable logic, circuitry, code, and/or interfaces to enable physical layer access.

Figure 3:
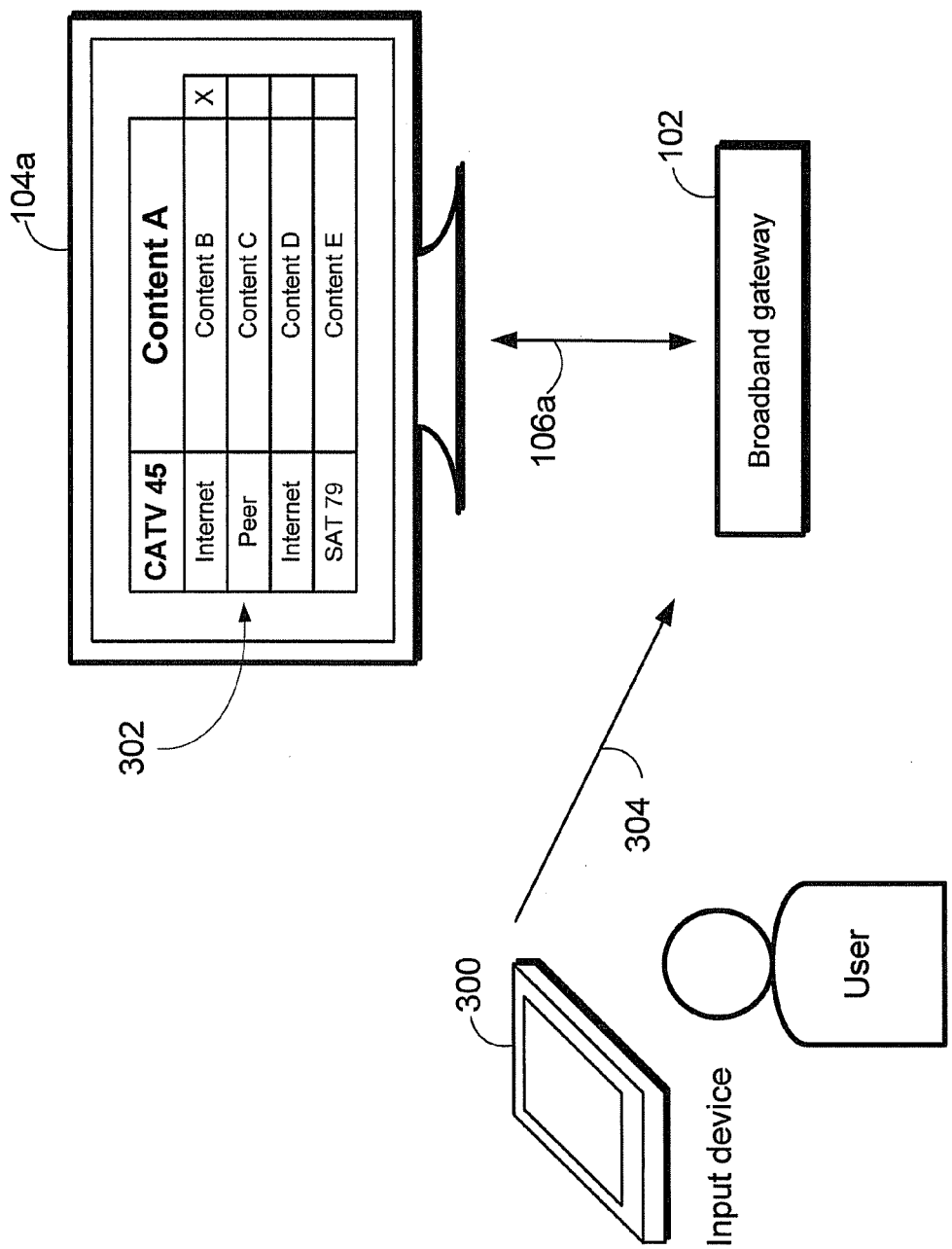
FIG. 3 is a diagram that illustrates exemplary user interactions with a broadband gateway, in accordance with an embodiment of the invention.

FIG. 3 is a diagram that illustrates exemplary user interactions with a broadband gateway, in connection with an embodiment of the invention. Referring to FIG. 3, there is shown the broadband gateway 102 and the television 104a described above. The television 104a may display a menu 302, which may be part of a graphical user interface. The graphical user interface may present the user with content-related information in a manner similar to that of an electronic programming guide (EPG) or an interactive programming guide (IPG). The menu 302 may present information related to a particular content that is of interest to the user. The menu 302 may also present information of other content related to or associated with the content of interest. The information presented may comprise programming scheduling information, content quality information, rating information, commentaries, and/or other like information that a user may consider when determining which content to combine from those that are presented by the menu 302. Also shown in FIG. 3 is an input device 300 that may be utilized by the user to interact with the broadband gateway 102. The input device 300 may be a keypad, a keyboard, a remote control, a smartphone, or other like device that enables the user to navigate, search, and/or make selections in connection with the information presented by the menu 302.

The menu 302 may be generated by the broadband gateway 102 and may subsequently be sent to the television 104a for display. The menu 302 may present content-related information, including programming scheduling information, for example. Because the broadband gateway 102 may receive content from a plurality of different sources through the network access service providers 120, the menu 302 may present content-related information from a wide range of sources. For example, the menu 302 may present content-related information from different sources that may comprise, but need not be limited to, sources of broadcast television, cable television, satellite television, on-demand programming, Internet protocol television (IPTV), news tickers or other scoreboard-style displays, Internet radio, audio feeds, and user-generated content, for example.

The input device 300 may be utilized to control the broadband gateway 102 and/or to send instructions or commands associated with the menu 302. For example, the input device 300 may typically communicate with the broadband gateway 102 through a link 304. The user may utilize the input device 300 to select a channel or mode in which the television 104a displays the menu 302 generated by the broadband gateway 102 and communicated to the television 104a via the link 106a. The user may then send instructions or commands to the broadband gateway 102, which in turn may perform certain operations and may communicate results associated with those operations to the television 104a via the link 106a. In this manner, any functions or operations that may be available in the broadband gateway 102 and are presented to a user through the menu 302 or a graphical user interface, may be accessed by the user through the input device 300.

Although FIG. 3 illustrates the television 104*a* being utilized to display the menu 302, the invention need not be so limited. Other devices in the home network 100*a* in FIG. 1 that may communicate with the broadband gateway 102 and that comprise a display area in which to display the menu 302 may also be utilized. For example, the laptop computer 104*b* and the mobile phone 104*e* may be utilized to enable user interaction with the menu 302. In such instances, the broadband gateway 102 may comprise information about such devices and may utilize that information to generate the menu 302. For example, the broadband gateway 102 may have information related to the display capacity of the laptop computer 104*b* and the mobile phone 104*e*, and may configure and render the menu 302 in accordance to that capacity.

The broadband gateway 102 may identify, catalogue, rank, and/or correlate content that is related to the content of interest to the user. That is, the broadband gateway 102 may determine aspects or characteristics that are common between the content of interest and other content that is received and/or may be received by the broadband gateway 102. For example, when the menu 302 displays content-related information for a satellite television channel or station of interest to the user, the menu 302 may also display information related to other contents that have common aspects with the content of interest.

In determining which content have common aspects, the broadband gateway 102 may utilize hardware and/or software to process information comprised in programming scheduling information and/or in metadata associated with the content. Such information may comprise, for example, scheduling information, content description, content ratings, source information, and/or other like information that may be utilized by the broadband gateway 102 to determine common aspects between content. The menu 302 may show the type of association or relationship that exists between the content that of interest to the user and other related content that is also presented by the menu 302. The user may then activate one or more keys in the input unit 300 to communicate instructions or commands to the broadband gateway 102 for combining the content of interest with any one of the related contents also listed on the menu 302.

In the exemplary scenario illustrated in FIG. 3, the menu 302 may present information related to the content of a current channel or station that is of interest to the user. For example, at the top of the menu 302 there is listed a "Content A" associated with a CATV channel 45. The "Content A" may be a particular sporting event, newscast, or movie, for example, that the user is interested to watch. Although not shown in FIG. 3, the menu 302 may present information in connection with the "Content A" that may comprise one or more of a type of program, a program description, a program schedule, a genre, ratings, and commentaries. Some or all of this information may be received as programming scheduling information and/or metadata by the broadband gateway 102. In some instances, at least a portion of the metadata received by the broadband gateway 102 may originate from a third-party source, for example.

The broadband gateway 102 may determine other content that is related to the "Content A" in the CATV channel 45. In this exemplary scenario, the menu 302 may present to the user a "Content B" available through the Internet, a "Content C" available from a peer, a "Content D" also available through the Internet, and a "Content E" available through a satellite (SAT) television channel 79. The menu 302 may present information associated with each of the contents related to the "Content A" to the user to indicate the relationship and/or common aspects that may exist between the "Content A" and the other contents listed.

Also illustrated in FIG. 3 is a box next to each of the related contents. Such a box may be utilized to indicate which of the related contents has been selected by the user through the input device 300 to be combined with the "Content A." In the example shown in FIG. 3, the "Content B" has been marked with an "X" to show that it has been selected by the user for combination with the "Content A." This approach is shown by way of illustration. Other approaches may also be utilized in connection with the graphical user interface that comprises the menu 302 to enable the user to navigate, search, make, and/or indicate content selections in connection with the information presented in the menu 302.

The menu 302 and/or the graphical user interface associated with the menu 302 may present information that enables the user to interact with the broadband gateway 102 to disable the combination of contents and allow a single content to be utilized. In this manner, the user may revert back to having the content of interest available by itself.

The exemplary scenario of the contents displayed on the menu 302 as illustrated in FIG. 3 is utilized below to illustrate methods and/or operating scenarios described with respect to FIGS. 4-5D in which different contents may be combined by the broadband gateway 102.

Figure 4:
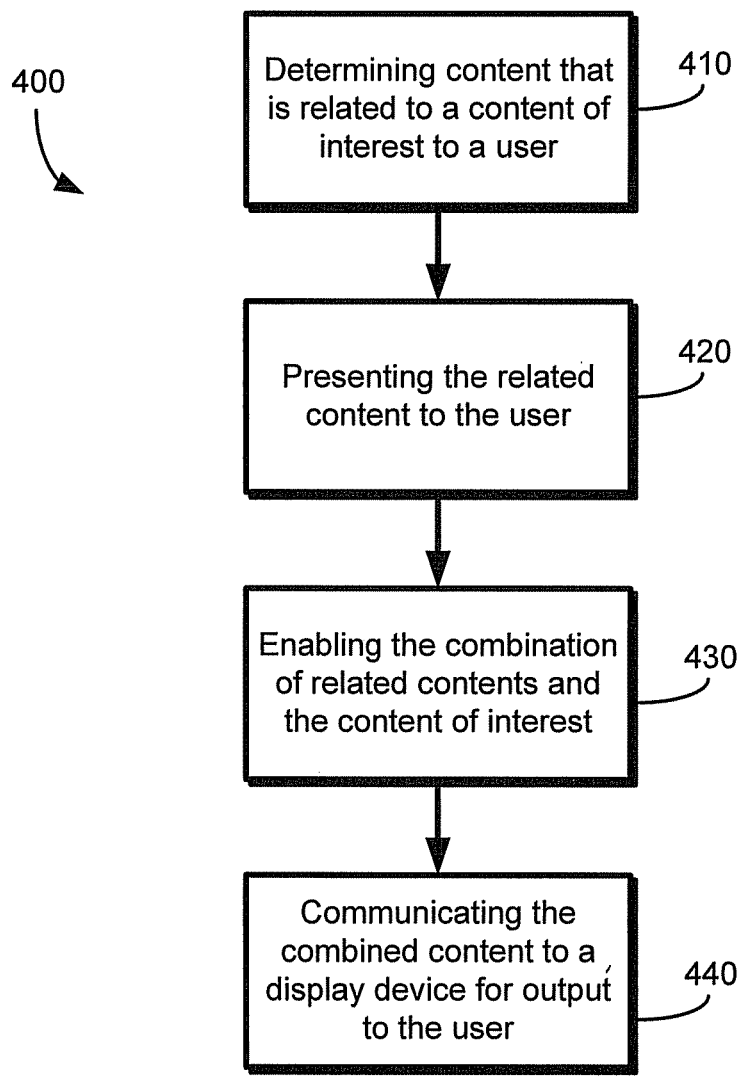
FIG. 4 is a flow diagram that illustrates exemplary steps for combining different contents utilizing a broadband gateway, in accordance with an embodiment of the invention.

FIG. 4 is a flow diagram that illustrates exemplary steps for combining different contents utilizing a broadband gateway, in accordance with an embodiment of the invention. Referring to FIG. 4, there is shown a flow chart 400 in which, at step 410, the broadband gateway 102 may determine content that is related to content of interest to a user. For example, as illustrated above with respect to the menu 302 in FIG. 3, the broadband gateway 102 may present a user interested in the "Content A" with other related content such as the "Content B," the "Content C," the "Content D," and the "Content E." The broadband gateway 102 may determine which content may be related to the content of interest based on programming scheduling information and/or metadata associated with the content. In some instances, the broadband gateway 102 may base the determination on historical information regarding content found to have been related and/or content that was previously combined. The broadband gateway 102 may rate and/or rank related content based on, for example, a likelihood or probability that the related content may be selected for combination with the content of interest. Such rating and/or ranking may be utilized with respect to the menu 302 to determine the order in which the related content are listed, for example. In such an instance, the content that is first listed may be the most likely to be selected for combination with the content of interest and the content that is last on the list may be the least likely to be selected for combination with the content of interest.

At step 420, the broadband gateway 102 may generate a graphical user interface, such as one comprising the menu 302 described above, for example, to present to the user information associated with the content of interest and with the one or more contents found to be related to the content of interest. In this regard, the broadband gateway 102 may generate a video feed and/or an audio feed associated with the graphical user interface to be communicated to the television 104*a*. Once the content-related information is presented to the user, he or she may be able to determine which related content to combine with the content of interest.

At step 430, the broadband gateway 102 may enable a user to combine or blend the content of interest with one or more related contents. In this regard, the broadband gateway 102 may enable the selection of one or more content to be combined with the content of interest to produce a combined content. In some embodiments of the invention, the combination may be performed by transforming or transcoding the various content to be combined to a common format and combining the content in that common format. Such may be the case when the content to be combined are video streams having different formats such as different encoding formats, for example. Moreover, the broadband gateway 102 may enable the synchronization of the contents to produce the combined content.

At step 440, the broadband gateway 102 may communicate the combined content to one or more of the home devices in the home network 100a. In this regard, the broadband gateway 102 may format the combined content in accordance with the type of processing capabilities, such as encoding/decoding capabilities, and/or the type of display properties, such as resolution properties, supported by the home devices to which the combined content is to be communicated. In some instances, the manner in which the contents are combined according to step 430 above may be based, at least partially, on the type of processing capabilities and/or display properties of the device that is to receive and output the combined content. Moreover, the combined content may be communicated to a home device utilizing a single signal or multiple signals. When multiple signals are utilized, each of the signals may carry a portion of the combined content.

Figure 5A:
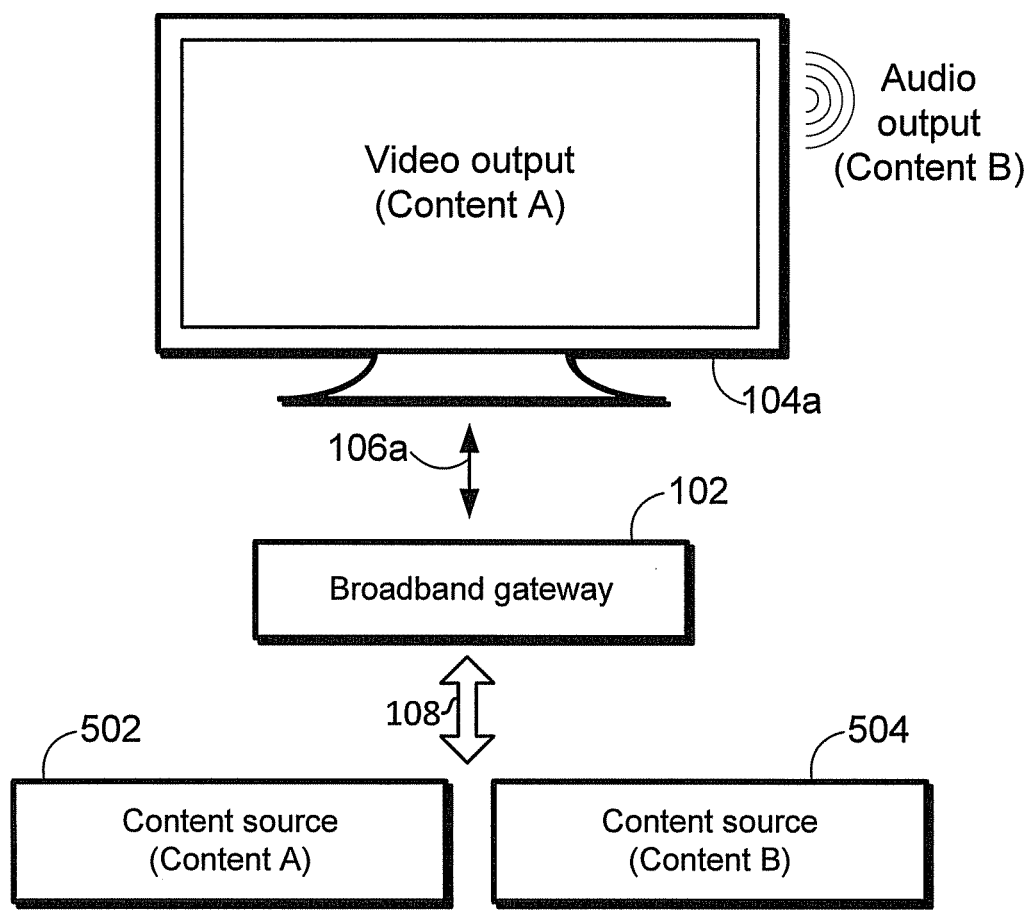
FIGS. 5A-5D are diagram that illustrate exemplary scenarios for combining different contents utilizing a broadband gateway, in accordance with embodiments of the invention.

FIG. 5A is diagram that illustrates an exemplary scenario for combining different contents utilizing a broadband gateway, in accordance with an embodiment of the invention. Referring to FIG. Referring to FIG. 5A, there is shown a first content combination scenario that utilizes the broadband gateway 102 and the television 104a. Also shown in FIG. 5A are a first source of content or content source 502, and a second source of content or content source 504. The content source 502 and the content source 504 may communicate with the broadband gateway 102 through one or more broadband connections 108. The content source 502 and the content source 504 may provide content to the broadband gateway 102 through one or more network access service providers 120.

In this exemplary scenario, the user may wish to combine the "Content A" associated with the CATV channel 45 and the "Content B" available through the Internet as described above with respect to FIG. 3. The "Content A" may be provided by the content source 502 and may comprise a television broadcast of a sporting event, such as a baseball or a football game, for example. The "Content B" may be provided by the content source 504 and may comprise a radio broadcast available on the Internet that provides radio commentary of the game being televised on the CATV channel 45, such as a play-by-play description of the game, for example. The user may find the commentary provided by the radio sports broadcasters in the "Content B" to be more to his or her liking than the commentary provided by the television sports broadcasters in the "Content A." Thus, by combining the "Content A" and the "Content B" the user may be able to watch the video portion of the televised broadcast of the game and may listen to the commentary from the Internet radio broadcast of the game.

To combine the "Content A" and the "Content B," the user may provide instructions through the input unit 300 such that the broadband gateway 102 may select one or more signals received by the provider interface module 202 in the broadband gateway 102 that comprise the "Content A" and the "Content B." Once the signals comprising the "Content A" and the "Content B" are selected, the processor module 204 in the broadband gateway 102 may process the signals to enable the combination of the selected content. For example, the broadband gateway 102 may synchronize one or more signals associated with the "Content A" and the "Content B" and may combine those signals to produce a combined content. In the exemplary scenario of FIG. 5A, the audio portion of the televised broadcast of the game in the "Content A" may be replaced by the radio commentary from the Internet radio broadcast of the game in the "Content B." The combined content may be communicated to the television 104a where the video portion of the televised broadcast of the game and the radio commentary from the Internet radio broadcast of the game are output to the user.

Figure 5B:
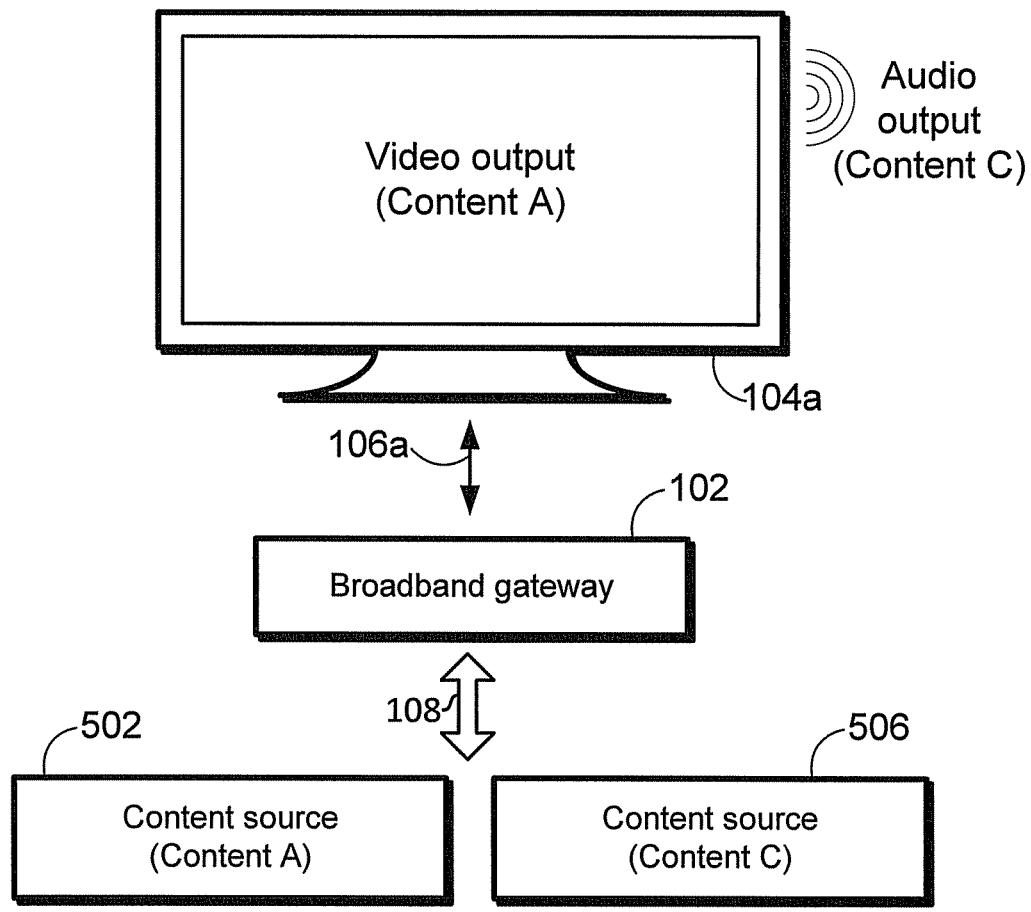

FIG. 5B is diagram that illustrates another exemplary scenario for combining different contents utilizing a broadband gateway, in accordance with an embodiment of the invention. Referring to FIG. 5B, there is shown a second content combination scenario that utilizes the broadband gateway 102 and the television 104a. Also shown in FIG. 5B are the content source 502 and a third source of content or content source 506. The content source 502 and the content source 506 may communicate with the broadband gateway 102 through one or more broadband connections 108. The content source 502 and the content source 506 may provide content to the broadband gateway 102 through one or more network access service providers 120.

In this exemplary scenario, the user may wish to combine the "Content A" associated with the CATV channel 45 and the "Content C" available from a peer as described above with respect to FIG. 3. The "Content C" may be provided by the content source 506 and may comprise user-generated commentary of the game being televised on the CATV channel 45, such as comments from friends, family, and/or other groups that may communicate with the broadband gateway 102 through a peer-to-peer configuration. The user may find the commentary provided in the "Content C" to enhance the experience of watching the game by getting the reaction and/or perspective of others who are also watching the game. Thus, by combining the "Content A" and the "Content C," the user may watch the video portion of the televised broadcast of the game and may listen to both the audio portion of the televised broadcast and the audio commentary generated by others watching the game.

In order to combine the "Content A" and the "Content C," the user may provide instructions through the input unit 300 such that the broadband gateway 102 may select one or more signals received by the provider interface module 202 in the broadband gateway 102 that comprise the "Content A" and the "Content C." Once the signals comprising the "Content A" and the "Content C" are selected, the processor module 204 in the broadband gateway 102 may process the signals to enable the combination of the selected contents. For example, the broadband gateway 102 may synchronize one or more signals associated with the "Content A" and the "Content C" and may combine those signals to produce a combined content. In the exemplary scenario of FIG. 5B, the audio commentary provided in the "Content C" may be added to or mixed together with the audio portion of the televised broadcast of the game. The combined content may be communicated to the television 104a where the video and audio portions of the televised broadcast of the game and the peer audio commentary may be concurrently output to the user.

Figure 5C:
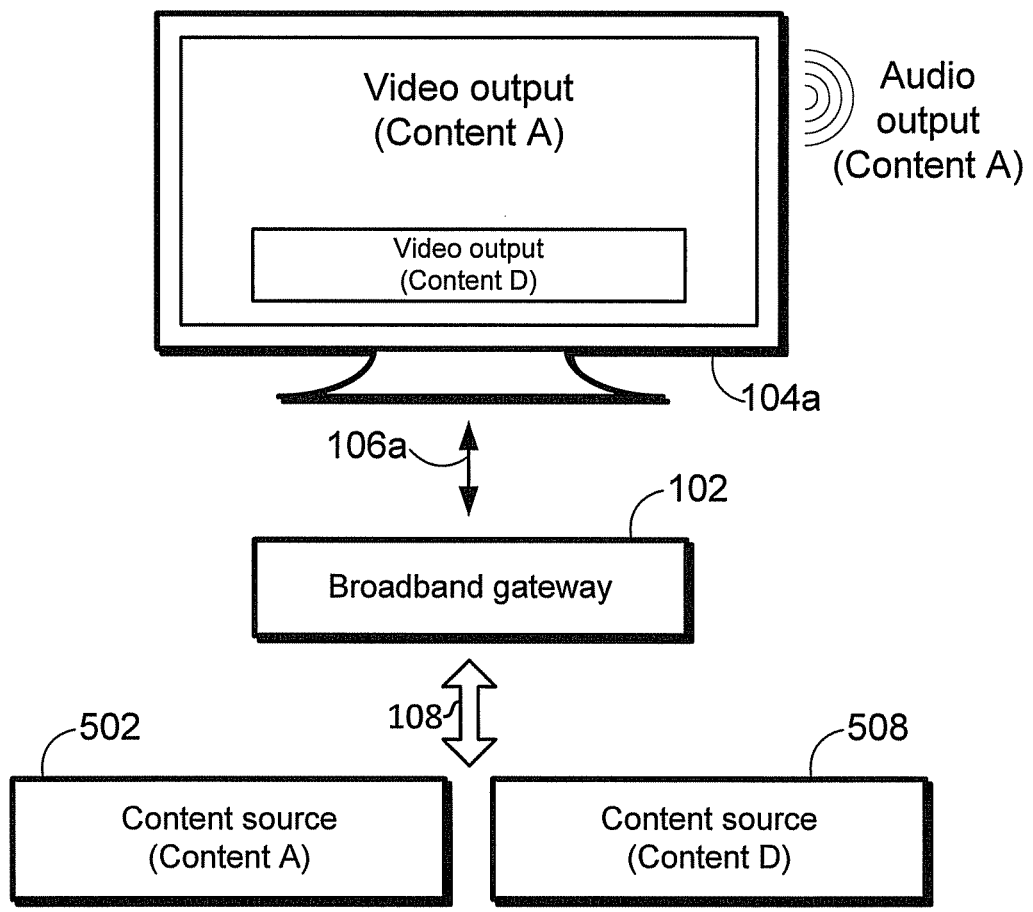

FIG. 5C is diagram that illustrates another exemplary scenario for combining different contents utilizing a broadband gateway, in accordance with an embodiment of the invention. Referring to FIG. 5C, there is shown a third content combination scenario that utilizes the broadband gateway 102 and the television 104*a*. Also shown in FIG. 5C are the content source 502 and a fourth source of content or content source 508. The content source 502 and the content source 508 may communicate with the broadband gateway 102 through one or more broadband connections 108. The content source 502 and the content source 508 may provide content to the broadband gateway 102 through one or more network access service providers 120.

In this exemplary scenario, the user may wish to combine the "Content A" associated with the CATV channel 45 and the "Content D" available through the Internet as described above with respect to FIG. 3. The "Content D" may be provided by the content source 508 and may comprise a scores ticker or crawler that presents game score updates, for example. Such content may be available from a third-party, for example. The user may find that the score updates presented by the scores ticker in the "Content D" are more complete, are more intuitive, and/or are more up-to-date than the score updates provided by the televised broadcast of the game in the "Content A." Thus, by combining the "Content A" and the "Content D" the user may watch and listen to the televised broadcast of the game and may also watch the scores ticker.

To combine the "Content A" and the "Content D," the user may provide instructions through the input unit 300 such that the broadband gateway 102 may select one or more signals received by the provider interface module 202 in the broadband gateway 102 that comprise the "Content A" and the "Content D." Once the signals comprising the "Content A" and the "Content D" are selected, the processor module 204 in the broadband gateway 102 may process the signals to enable the combination of the selected contents. For example, the broadband gateway 102 may synchronize one or more signals associated with the "Content A" and the "Content D" and may combine those signals to produce a combined content. In the exemplary scenario of FIG. 5C, the video portion of the "Content A" may be combined with the scores ticker in the "Content D." The combined content may be communicated to the television 104*a* where the combined video may be displayed and the audio portion of the televised broadcast may be reproduced.

Figure 5D:
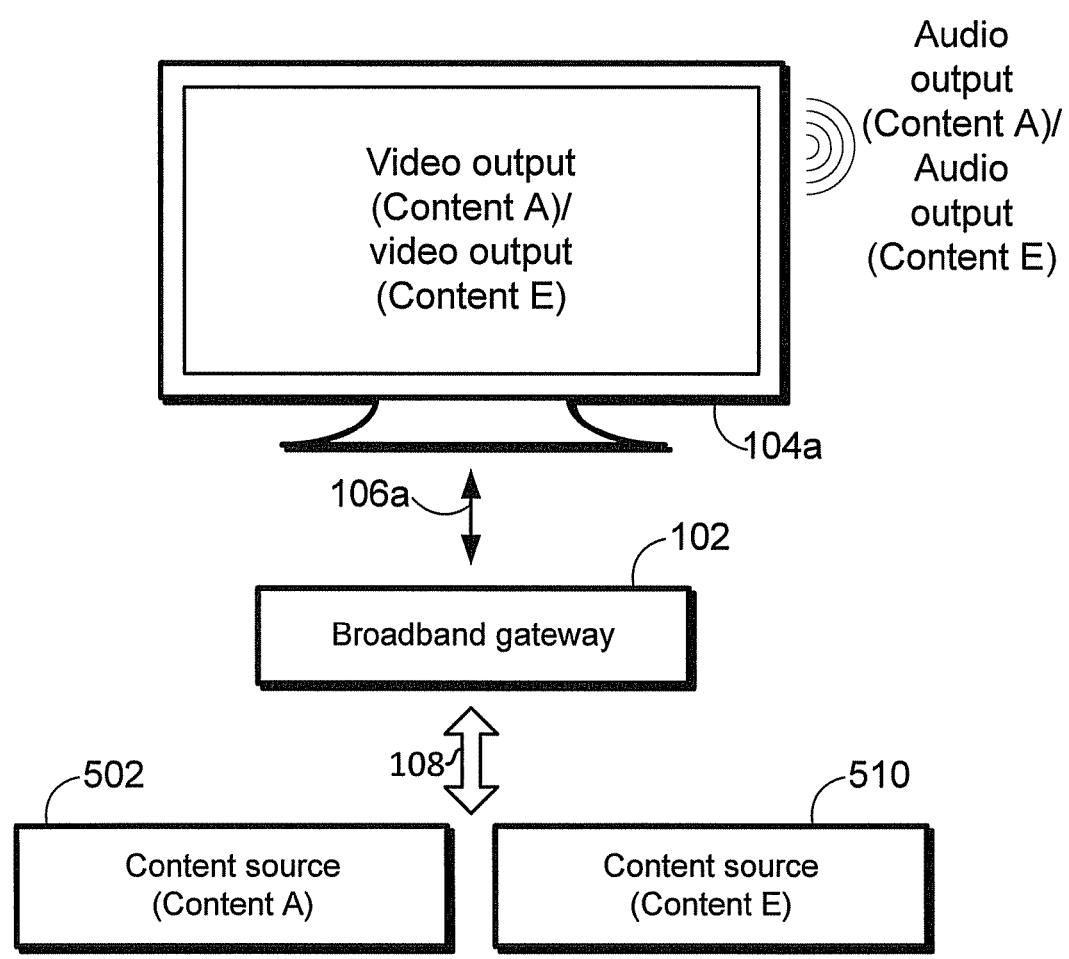

FIG. 5D is diagram that illustrates yet another exemplary scenario for combining different content utilizing a broadband gateway, in accordance with an embodiment of the invention. Referring to FIG. 5D, there is shown a fourth content combination scenario that utilizes the broadband gateway 102 and the television 104*a*. Also shown in FIG. 5D are the content source 502 and a fifth source of content or content source 510. The content source 502 and the content source 510 may communicate with the broadband gateway 102 through one or more broadband connections 108. The content source 502 and the content source 510 may provide content to the broadband gateway 102 through one or more network access service providers 120.

In this exemplary scenario, the user may wish to combine the "Content A" associated with the CATV channel 45 and the "Content E" associated with the SAT channel 79 as described above with respect to FIG. 3. The "Content E" may be provided by the content source 510 and may comprise a television broadcast of a second game that is concurrent with the television broadcast of the first game on the CATV channel 45. The user may want to have the second game associated with the "Content E" available during the commercials and/or other programming breaks that occur in the first game. Thus, by temporally combining the "Content A" and the "Content D" the user may watch the televised broadcast of the first game and portions of the televised broadcast of the second game without having to change channels on the television 104*a*.

To combine the "Content A" and the "Content E," the user may provide instructions through the input unit 300 such that the broadband gateway 102 may select one or more signals received by the provider interface module 202 in the broadband gateway 102 that comprise the "Content A" and the "Content E." Once the signals comprising the "Content A" and the "Content E" are selected, the processor module 204 in the broadband gateway 102 may process the signals to enable the combination of the selected contents. For example, the broadband gateway 102 may synchronize one or more signals associated with the "Content A" and the "Content E" and may combine those signals to produce a combined content. In the exemplary scenario of FIG. 5D, the broadband gateway 102 may detect or identify breaks in the televised broadcast of the first game and may replace the portions of the televised broadcast of the first game associated with the breaks with portions of the televised broadcast of the second game. The combined content may be communicated to the television 104*a* where the first game and the second games are alternated based on commercial or other breaks that occur during the first game.

In another embodiment of the invention, when the broadband gateway 102 detects or identifies a break in the televised broadcast of the second game while the second game is being displayed on the television 104*a*, the broadband gateway 102 may replace the portions of the televised broadcast of the second game associated with the breaks with portions of the televised broadcast of the first game.

The scenarios presented above are provided by way of illustration and not of limitation. Other scenarios may be possible in which different contents provided to the broadband gateway 102 may be combined to produce a combined content that may be displayed and/or reproduced by a device coupled to the broadband gateway 102. One or more aspects of the scenarios described above may be utilized to provide for other scenarios in which contents may be combined by the broadband gateway 102. Moreover, the broadband gateway 102 may support the combination of more than two contents from different sources. For example, regarding the scenarios described above with respect to FIGS. 5A and 5B, the broadband gateway 102 may enable the combination of the video portion of the televised broadcast provided in the "Content A," the Internet radio commentary provided in the "Content B," and the peer commentary provided in the "Content C."

Figure 6:
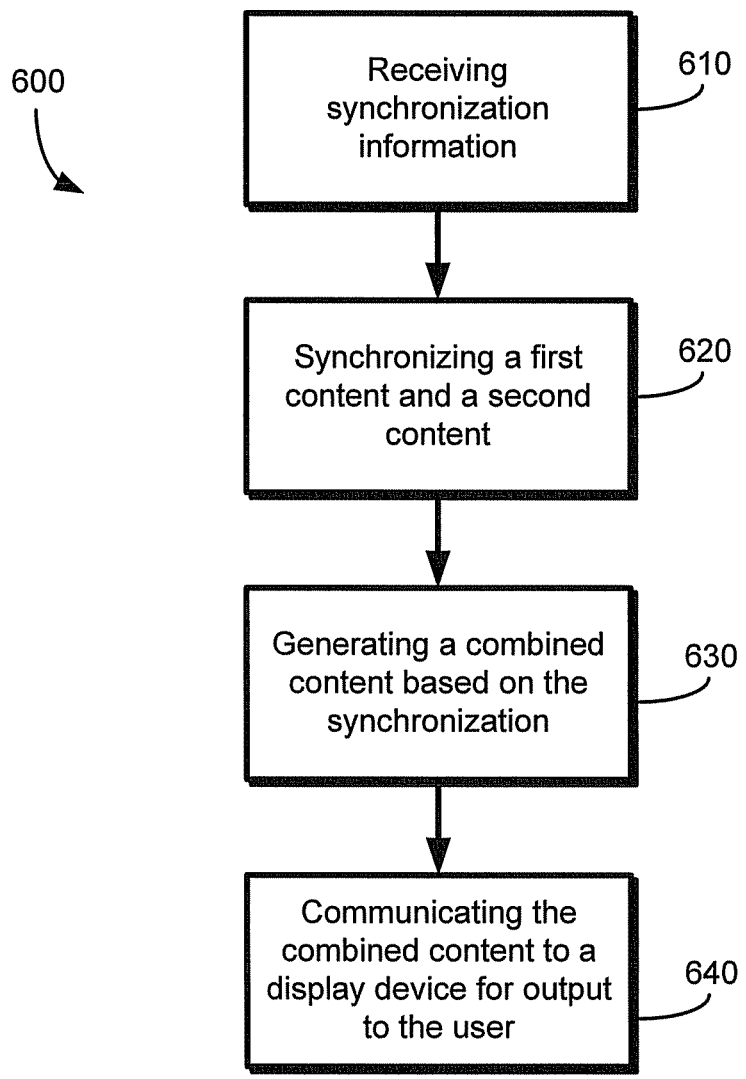
FIG. 6 is a flow diagram that illustrates exemplary steps for synchronizing different contents utilizing a broadband gateway, in accordance with an embodiment of the invention.

FIG. 6 is a flow diagram that illustrates exemplary steps for synchronizing different contents utilizing a broadband gateway, in accordance with an embodiment of the invention. Referring to FIG. 6, there is shown a flow chart 600 in which, at step 610, the broadband gateway 102 may receive synchronization information. The broadband gateway 102 may receive synchronization information associated with the contents to be combined and/or synchronization information that may be utilized by the broadband gateway 102 to generate one or more reference signals. The synchronization information associated with each of the content to be combined may comprise, but need not be limited to, a clock signal, a reference signal, a reference packet or frame, and/or other like signal, packet, or frame that provides timing information. The synchronization information associated with each of the content to be combined may be received from the sources of the content and may be comprised within the content itself.

The other synchronization information that may be received by the broadband gateway 102 may originate at the home device in the network 100a in which the combined content is to be output, some other home device in the network 100a, a service provider, and/or a GPS service, for example. The synchronization module 204a in the broadband gateway 102 may utilize any one of such signals as a reference signal and/or to generate a reference signal that may be utilized for synchronizing the contents to be combined.

At step 620, the synchronization module 204a may synchronize the contents to be combined based on the synchronization information. For example, the synchronization module 204a may generate through a PLL a reference signal and may utilize the reference signal generated to align the timing of the contents to be combined. The synchronization module 204a may do so automatically to within an acceptable and/or programmable error, for example. In some instances, a user may perceive that the combined contents are not properly synchronized and may provide feedback that may be utilized by the synchronization module 204 to adjust a timing offset or time delay that may occur between the contents. In some instances, the synchronization may be based on the slowest clock signal of the clock signals associated with the contents to be combined.

At step 630, the broadband gateway 102 may generate the combined content based on the synchronization described in step 620. For example, the processor module 204 may aggregate, put together, add together, and/or mix together at least a portion of each of two or more of the multiple contents received by the broadband gateway 102 when the contents have been synchronized. At step 640, the broadband gateway 102 may communicate the combined content to one or more home devices in the home network 100a. Once the combined content is output by a home device, the user may be able to perceive any apparent delay or offset in the synchronization of the contents and may be able to provide feedback to the broadband gateway 102 through, for example, the input device 300 to make adjustments in the synchronization of the combined output. For example, when the "Content A" and the "Content B" described above in the scenarios of FIGS. 5A and 5B are combined and are output to the user, the user may perceive whether the timing of the radio commentary is offset from the occurrence of events in the televised broadcast of the game and may provide feedback to the broadband gateway 102 to adjust the synchronization.

In an embodiment of the invention, a broadband gateway, such as the broadband gateway 102, may be operable to handle separate physical layer access for each of a plurality of network access service providers, such as the network access service providers 120. The broadband gateway 102 may enable communication with a plurality of devices, such as the home devices 104a-104j, for example. The broadband gateway 102 may receive a first content from a first source and a second content from a second source, both of which may be received through one or more of the network access service providers 120. The broadband gateway 102 may combine the received first content and the received second content to produce a combined content, where the combination may be based on a synchronization of the received first content and the received second content. The broadband gateway 120 may communicate the combined content to a device communicatively coupled with the broadband gateway through a local network, such as the home network 100a. The combined content may be output to a user by the device. The device may be a display device such as the television 104a, for example, or other like device capable of displaying and/or reproducing content. The broadband gateway 102 may combine a portion of the received first content and a portion of the received second content, where the portion of the received first content may be associated with a time period different from a time period associated with the portion of the received second content.

In some instances, the synchronization of the received first content and the received second content may be performed automatically. The synchronization of the received first content and the received second content may also be performed based on user input. The synchronization of the received first content and the received second content may be based on one or more of a clock signal received from the device, a clock signal received from another device communicatively coupled to the broadband gateway 102 through the home network 100a, and a clock signal received through one or more of the network access service providers 120. The synchronization of the received first content and the received second content may be based on a slowest of a clock signal associated with the received first content and a clock signal associated with the received second content.

In some instances, the first source may be a first content provider and the second source may be a second content provider. The first content may be video image data and the second content may be audio data, for example. The first content may be user-generated content and the first source may be in a peer-to-peer configuration with the broadband gateway 102.

The broadband gateway 102 may receive a third content from a third source through one or more of the network access service providers 120. The broadband gateway 102 may select two contents from the received first content, the received second content, and the received third content, and may combine the two selected contents to produce the combined content. The combination of the two selected contents may be based on synchronization of the two selected contents.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for combining and/or blending multiple content from different sources in a broadband gateway.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
providing, by a broadband gateway enabling communication with a plurality of devices, at least a first content from a first source and a second content from a second source for selection via a user interface to produce a combined content, the first content and the second content received through one or more network access service providers;
receiving, via the user interface, a selection of the first content and the second content;
combining, via synchronization circuitry of the broadband gateway responsive to the received selection, the first content and the second content to produce the combined content by aligning timing of the first content and the second content using a slowest of a clock signal associated with a first of the first and second contents, and a clock signal associated with a second of the first and second contents; and
sending, by the broadband gateway, the combined content to a device of a plurality of devices.

2. The method of claim 1, comprising combining, by the synchronization circuitry of the broadband gateway, through interleaving, a portion of the received first content and a portion of the received second content for interleaved output by the device, the portion of the received first content being associated with a first output time period different from a second output time period associated with the portion of the received second content.

3. The method of claim 1, comprising receiving an instruction, via the user interface, to include a time delay or offset between the first content and the second content being combined.

4. The method of claim 1, wherein the first source is a first content provider and the second source is a second content provider.

5. The method of claim 1, wherein the first content and the second content comprise video image data to be concurrently output by the device.

6. The method of claim 1, wherein the first content comprises video image data and the second content comprises audio data to be concurrently output by the device.

7. The method of claim 1, wherein the first content comprises user-generated content, and the first source is in a peer-to-peer configuration with the broadband gateway.

8. A system, comprising:
a broadband gateway configured to enable communication with a plurality of devices, the broadband gateway comprising circuitry configured to:
provide at least a first content from a first source and a second content from a second source for selection via an interface to produce a combined content, the first content and the second content received through one or more network access service providers;
receive, via the interface, a selection of the first content and the second content;
combine, responsive to the received selection, the first content and the second content to produce the combined content by aligning timing of the first content and the second content using a slowest of a clock signal associated with a first of the first and second contents, and a clock signal associated with a second of the first and second contents; and
send the combined content to a device of the plurality of devices.

9. The system of claim 8, wherein the circuitry is configured to combine a portion of the received first content and a portion of the received second content for interleaved output by the device, the portion of the received first content being associated with a first output time period different from a second output time period associated with the portion of the received second content.

10. The system of claim 8, wherein the circuit circuitry is configured to receive an instruction, via the interface, to include a time delay or offset between the first content and the second content being combined.

11. The system of claim 8, wherein the first source is a first content provider and the second source is a second content provider.

12. The system of claim 8, wherein the first content and the second content comprise video image data to be concurrently output by the device.

13. The system of claim 8, wherein the first content comprises video image data and the second content comprises audio data to be concurrently output by the device.

14. The system of claim 8, wherein the first content comprises user-generated content, and the first source is in a peer-to-peer configuration with the broadband gateway.

15. A method, comprising:
providing, by a broadband gateway enabling communication with a plurality of devices, at least a first content from a first source for selection via a user interface, the first content received through one or more service providers;
providing, by the broadband gateway, a second content from a second source for selection via the user interface to combine with the first content, the second content comprising user-provided content;
receiving, via the user interface, a selection of the first content and the second content;
combining, via synchronization circuitry of the broadband gateway responsive to the received selection, the first content and the second content to produce a combined content by aligning timing of the first content and the second content using a slowest of a clock signal associated with a first of the first and second contents, and a clock signal associated with a second of the first and second contents; and
sending the combined content to a device of the plurality of devices.

16. The method of claim 15, comprising receiving an instruction, via the user interface, to include a time delay or offset between the first content and the second content being combined.

17. The method of claim 15, wherein the first content and the second content comprise image data to be concurrently output by the device.

18. The method of claim 15, wherein a first of the first content and the second content comprises video image data, and a second of the first content and the second content comprises audio data.

* * * * *